United States Patent
Osaka et al.

(10) Patent No.: US 10,450,723 B2
(45) Date of Patent: Oct. 22, 2019

(54) HYBRID CONSTRUCTION MACHINERY

(71) Applicant: Hitachi Construction Machinery Co., Ltd., Taito-ku, Tokyo (JP)

(72) Inventors: Tadashi Osaka, Tokyo (JP); Ken Takeuchi, Tsuchiura (JP); Seiji Ishida, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 15/774,689

(22) PCT Filed: Oct. 31, 2016

(86) PCT No.: PCT/JP2016/082229
§ 371 (c)(1),
(2) Date: May 9, 2018

(87) PCT Pub. No.: WO2017/110250
PCT Pub. Date: Jun. 29, 2017

(65) Prior Publication Data
US 2018/0320338 A1 Nov. 8, 2018

(30) Foreign Application Priority Data

Dec. 25, 2015 (JP) .................................. 2015-254033

(51) Int. Cl.
*B60K 6/28* (2007.10)
*E02F 9/20* (2006.01)
(Continued)

(52) U.S. Cl.
CPC .............. *E02F 9/2075* (2013.01); *B60K 6/28* (2013.01); *B60L 50/15* (2019.02); *B60L 50/16* (2019.02);
(Continued)

(58) Field of Classification Search
CPC ..... B60L 50/15; B60K 6/28; B60K 2001/006; B60K 2001/005; B60K 2001/008;
(Continued)

(56) References Cited

U.S. PATENT DOCUMENTS 8,571,735 B2 * 10/2013 Koga ...................... B60L 58/27
701/22
8,639,422 B2 * 1/2014 Ota ......................... E02F 9/2075
701/50
(Continued)

FOREIGN PATENT DOCUMENTS

JP      2008-290636 A    12/2008
JP      2012-154092 A     8/2012
(Continued)

OTHER PUBLICATIONS

International Search Report (PCT/ISA/210) issued in PCT Application No. PCT/JP2016/082229 dated Jan. 24, 2017 with English translation (five pages).

(Continued)

*Primary Examiner* — James A Shriver, II
*Assistant Examiner* — Steve Clemmons
(74) *Attorney, Agent, or Firm* — Crowell & Moring LLP

(57) ABSTRACT

Hybrid construction machinery has a power storage apparatus that can be warmed up quickly and has a lengthened life. The machinery includes an electric motor assisting a prime mover in power and generating electric power. The power storage apparatus transfers electric power to and from the electric motor. A warm-up circuit circulates a warming medium in the vicinity of the power storage apparatus, and a control device controls circulation of the warming medium. On-board equipment state detection units detect on-board equipment states to estimate an output request for the power storage apparatus from the on-board equipment. Circulation of the warming medium is controlled based on a temperature of the power storage apparatus and a determination temperature for determining whether to circulate the warming medium in the warm-up circuit. The control device further varies the determination temperature according to a result of detection by the on-board equipment state detection units.

3 Claims, 12 Drawing Sheets

(51) Int. Cl.
*H01M 10/625* (2014.01)
*H01M 10/615* (2014.01)
*H01M 10/633* (2014.01)
*H01M 10/6563* (2014.01)
*H01M 10/6568* (2014.01)
*H01M 10/613* (2014.01)
*E02F 9/08* (2006.01)
*E02F 9/22* (2006.01)
*B60L 50/15* (2019.01)
*B60L 50/16* (2019.01)
*B60K 1/00* (2006.01)

(52) U.S. Cl.
CPC .............. *E02F 9/0866* (2013.01); *E02F 9/20* (2013.01); *E02F 9/226* (2013.01); *H01M 10/613* (2015.04); *H01M 10/615* (2015.04); *H01M 10/625* (2015.04); *H01M 10/633* (2015.04); *H01M 10/6563* (2015.04); *H01M 10/6568* (2015.04); *B60K 2001/005* (2013.01); *B60K 2001/006* (2013.01); *B60Y 2200/412* (2013.01); *Y02T 10/7077* (2013.01)

(58) Field of Classification Search
CPC ............ H01M 10/615; H01M 10/625; H01M 10/633; E02F 9/2075
See application file for complete search history.

(56) References Cited

U.S. PATENT DOCUMENTS

| | | | | |
|---|---|---|---|---|
| 8,875,820 B2* | 11/2014 | Yamashita | ............ | E02F 9/2095 165/104.33 |
| 9,605,410 B2* | 3/2017 | Kitamura | ................ | E02F 9/123 |
| 9,896,822 B2* | 2/2018 | Kohno | .................. | E02F 9/0866 |
| 10,170,811 B2* | 1/2019 | Kossakovski | ....... | H01M 10/625 |
| 2005/0275383 A1* | 12/2005 | Ishishita | ................ | G01K 15/00 320/150 |
| 2011/0072841 A1* | 3/2011 | Arai | .................... | B60H 1/00278 62/259.2 |
| 2012/0034507 A1* | 2/2012 | Harada | ................. | H01M 2/206 429/120 |
| 2013/0111932 A1* | 5/2013 | Mishima | ................. | F25B 29/00 62/79 |
| 2013/0299256 A1 | 11/2013 | Yamashita | | |
| 2013/0319029 A1* | 12/2013 | Sekiya | ............... | B60H 1/00899 62/238.7 |
| 2017/0145658 A1* | 5/2017 | Imura | .................... | B60K 6/485 |

FOREIGN PATENT DOCUMENTS

| | | | |
|---|---|---|---|
| JP | 2013-55019 A | | 3/2013 |
| JP | 2014-91445 A | | 5/2014 |
| JP | 2015-94173 A | | 5/2015 |
| JP | 2015094173 A | * | 5/2015 |
| JP | 2016056527 A | * | 4/2016 |

OTHER PUBLICATIONS

Japanese-language Written Opinion (PCT/ISA/237) issued in PCT Application No. PCT/JP2016/082229 dated Jan. 24, 2017 (six pages).

* cited by examiner

*FIG. 12*

| | WARM QUICKLY (WARM-UP PRIORITY) | REDUCE NUMBER OF TIMES OF CONTROL VALVE OPERATION (LIFE PRIORITY) |
|---|---|---|
| (1) STATE OF WARM-UP/ WARM-UP MAINTENANCE | WARM-UP | WARM-UP MAINTENANCE |
| (2) STATE OF OPERATION LEVER (INCLUDING GATE LOCK LEVER) | OPERATED (OFF) | NOT OPERATED (ON) |
| (3) OPERATION MODE SETTING (OUTPUT MODE SETTING, ENGINE CONTROL SETTING) | HIGH OUTPUT SETTING | LOW OUTPUT SETTING |
| (4) WORKING FLUID TEMPERATURE | HIGH | LOW |
| (5) OUTSIDE AIR TEMPERATURE | LOW | HIGH |
| (6) ENGINE COOLING WATER TEMPERATURE | HIGH | LOW |
| (7) ENGINE SPEED | HIGH | LOW |

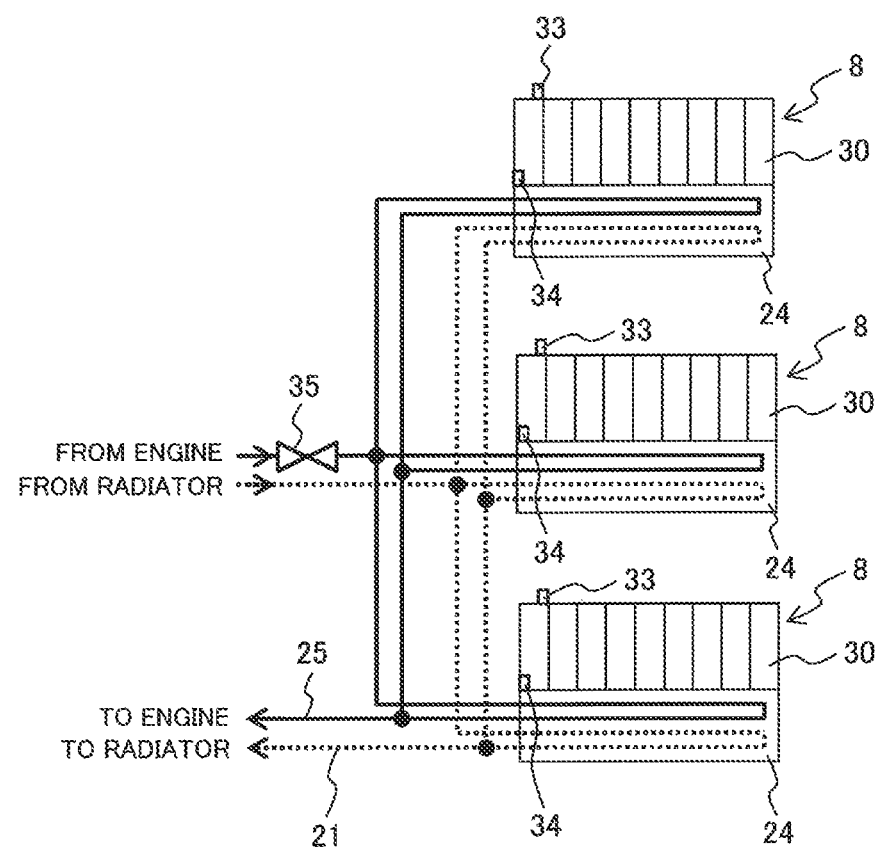

HYBRID CONSTRUCTION MACHINERY

TECHNICAL FILED

The present invention relates to hybrid construction machinery equipped with a power storage apparatus supplying electric power to a motor (electric motor), an inverter, and the like.

BACKGROUND ART

In recent years, hybrid or electric automobiles have become widespread in terms of energy saving and construction machinery has also been increasingly hybridized. In general, construction machinery, such as hydraulic excavators, driven by a hydraulic system is equipped with a hydraulic pump enabling maximum-load work and a large-sized engine driving this hydraulic pump so that the machinery can cope with every work from light-load work to heavy-load work.

However, with respect to construction machinery, heavy-load work, such as heavy excavation work, in which earth and sand is frequently digged and loaded is part of the entire work. During light-load work, such as horizontal tow operation, for smoothing the ground, the capability of an engine is redundant. This is one of the factors making it difficult to reduce a fuel consumption of hydraulic excavators. In consideration of the foregoing, there is known hybrid construction machinery in which an engine is reduced in size to reduce a fuel consumption and the engine is assisted by outputs of a power storage apparatus and an electric motor to make up insufficient output due to the engine size reduction. The electric equipment, such as the power storage apparatus and the electric motor, constituting this hybrid construction machinery requires appropriate temperature control for thermal protection for a drive circuit and highly efficient operation.

In particular, the power storage apparatus has an upper-limit temperature under which the apparatus can be used without a current limit but the output of the power storage apparatus is reduced at a low temperature. To use a power storage apparatus without incurring output reduction in the power storage apparatus, it is necessary to warm the power storage apparatus to a predetermined temperature or higher. For example, Japanese Patent Application Laid-Open No. 2008-290636 (Patent Literature 1) describes a hybrid car including: a water-cooled engine and a motor driving the car; a battery pack (power storage apparatus) supplying electric power to the motor; an engine radiator coupled to a cooling water passage of the water-cooled engine and circulating refrigerant liquid between the radiator and the water-cooled engine; and a heat exchanger coupled to a cooling water passage of the water-cooled engine through a bypass valve and warming up the power storage apparatus with the refrigerant liquid circulated to the water-cooled engine. In the hybrid car, waste heat of the engine is utilized to warm up the power storage apparatus.

CITATION LIST

Patent Literature

PTL 1: Japanese Patent Application Laid-Open No. 2008-290636

SUMMARY OF INVENTION

Technical Problem

In the warm-up method in Patent Literature 1, a power storage apparatus is warmed up by circulating engine coolant to the apparatus but heat is exchanged with the engine coolant isolated from the power storage apparatus with a waterproof sheet.

When engine coolant is brought into contact only with part of the power storage apparatus for a structural reason, only the part of the power storage apparatus is warmed up. In such a case, a temperature variation occurs in the interior of a plurality of battery cells constituting the power storage apparatus. A temperature variation in battery cells causes a variation in the internal resistance of the battery cells, which produces a portion where a current is prone to flow and a portion where a current is less prone to flow and can accelerate deterioration in a battery.

It is an object of the present invention to provide hybrid construction machinery in which a power storage apparatus can be warmed up quickly and a life of the power storage apparatus can be lengthened.

Solution to Problem

To achieve the above object, hybrid construction machinery of the present invention includes:

a prime mover; an electric motor assisting the prime mover in power and generating electric power; a power storage apparatus transmitting electric power to and from the electric motor; a warm-up circuit circulating a warming medium to the vicinity of the power storage apparatus; and a control device controlling circulation of the warming medium by the warm-up circuit.

This hybrid construction machinery is equipped with an on-board equipment state detection unit which detects a state of on-board equipment to estimate an output request from the on-board equipment to the power storage apparatus.

The control device controls circulation of the warming medium based on the temperature of the power storage apparatus and a determination temperature for determining whether to circulate the warming medium of the warm-up circuit.

The control device further changes the determination temperature according to a result of detection by the on-board equipment state detection unit.

Advantageous Effects of Invention

According to hybrid construction machinery of the present invention, it is possible to quickly warm up a power storage apparatus and further lengthen a life of the power storage apparatus.

Other problems, configuration elements, and effects than described above will be apparent from the following description of an embodiment.

BRIEF DESCRIPTION OF DRAWINGS

FIG. 12 is a drawing showing how a method for regulating a flow rate of a warming medium is changed according to a state of a vehicle in an embodiment of the present invention.

FIG. 15 is a drawing explaining how to connect a cooling circuit of a water jacket and a warm-up circuit and how to measure a temperature difference in a battery cell in cases where a plurality of power storage apparatuses are installed.

DESCRIPTION OF EMBODIMENTS

Hereafter, a description will be given to an embodiment in which hybrid construction machinery of the present invention is implemented based on the drawings.

Figure 1:
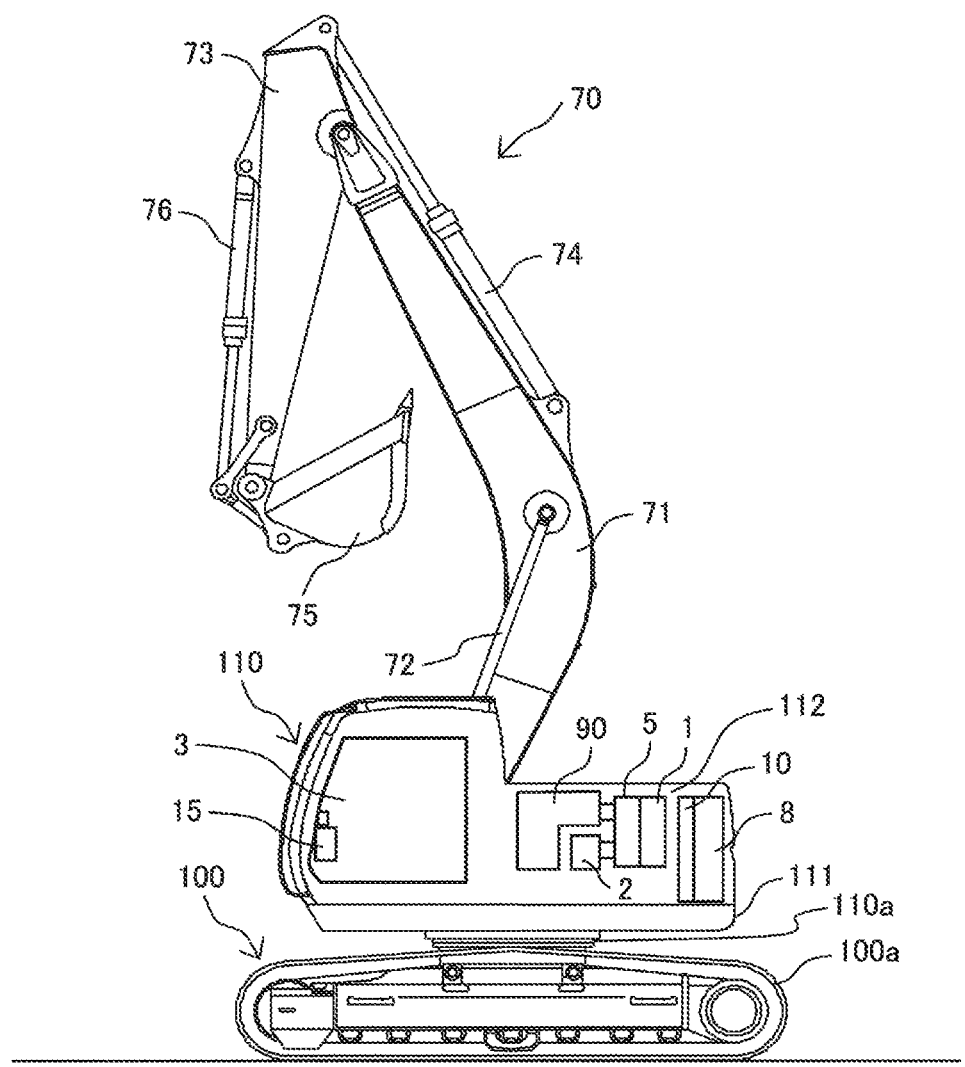
FIG. 1 is a drawing illustrating the configuration of a hybrid hydraulic excavator cited as an embodiment of hybrid construction machinery of the present invention.
Figure 2:
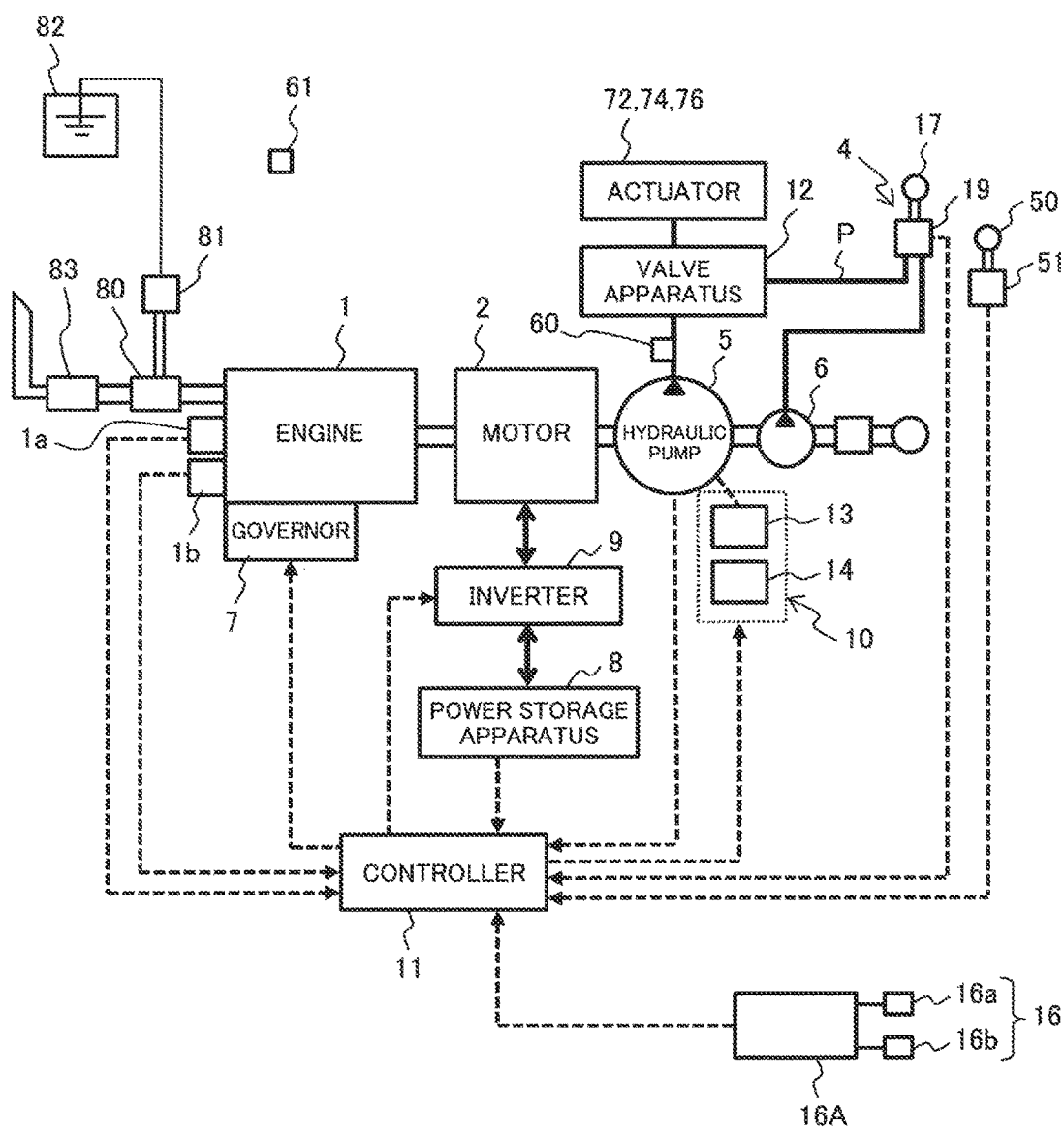
FIG. 2 is a drawing illustrating the configuration of a principal part of a hybrid hydraulic excavator in an embodiment of the present invention.

FIG. 1 illustrates a configuration of a hybrid hydraulic excavator cited as an embodiment of hybrid construction machinery of the present invention. FIG. 2 illustrates a configuration of a principal part of a hybrid hydraulic excavator in the embodiment.

An embodiment of hybrid construction machinery of the present invention is applied to, for example, a hybrid hydraulic excavator (hereafter, referred to as hydraulic excavator for convenience) as illustrated in FIG. 1. The hydraulic excavator in this embodiment includes: a traveling body 100; a swiveling body 110 rotatably provided over the traveling body 100 through a swiveling frame 111; and front work equipment 70 attached in front of the swiveling body 110 and vertically rotating to dig and other work. The front work equipment 70 is provided as work equipment of the hybrid construction machinery. For example, when the hybrid construction machinery is a dump truck, the work equipment thereof is configured of a bed. In short, work equipment is configured of on-board equipment mounted for hybrid construction machinery to play a role thereof.

The front work equipment 70 includes: a boom 71 whose base end is rotatably attached to the swiveling frame 111 and is vertically rotated; an arm 73 rotatably attached to a tip of the boom 71; and a bucket 75 rotatably attached to a tip of the arm 73. The front work equipment 70 further includes: a boom cylinder 72 that connects the swiveling body 110 and the boom 71 and is extended and contracted to rotate the boom 71; an arm cylinder 74 that connects the boom 71 and the arm 73 and is extended and contracted to rotate the arm 73; and a bucket cylinder 76 that connects the arm 73 and the bucket 75 and is extended and contracted to rotate the bucket 75.

As illustrated in FIG. 1 and FIG. 2, the swiveling body 110 includes: an operator's cab (cabin) 3 provided at the front part of the swiveling frame 111; an engine 1 as a prime mover provided in a prime mover chamber 112 at the rear part of the swiveling frame 111; a governor 7 adjusting a fuel injection quantity of the engine 1; an engine speed sensor $1a$ detecting the actual engine speed of the engine 1; an engine torque sensor $1b$ detecting a torque of the engine 1; and an assist power generation motor 2 as an electric motor assisting the engine 1 in power and generating electric power. The assist power generation motor 2 is disposed on the drive shaft of the engine 1 and transmitting torque between the motor 2 and the engine 1.

The swiveling body 110 further includes: an inverter apparatus 9 controlling a number of revolutions of the assist power generation motor 2; a power storage apparatus 8 transmitting electric power to and from the assist power generation motor 2 through the inverter apparatus 9; and a valve apparatus 12 controlling a flow rate and a direction of a hydraulic oil supplied to the above-mentioned hydraulic actuators, such as the boom cylinder 72, the arm cylinder 74, and the bucket cylinder 76.

A hydraulic system 90 for driving the hydraulic actuators 72, 74, 76 is provided in the prime mover chamber 112 of the swiveling body 110. The hydraulic system 90 includes: a hydraulic pump 5 and a pilot hydraulic pump 6 as hydraulic sources producing a pressurized oil; and an operating device 4 connected to an operating part of the valve apparatus 12 through a pilot pipe P and enabling a desired operation of each hydraulic actuator 72, 74, 76. The operating device 4 is provided in the operator's cab 3 and includes a cluster of operation levers 17 grasped and operated by an operator.

The swiveling body 110 further includes: a pump displacement adjuster 10 adjusting a displacement of the hydraulic pump 5; and a controller 11 as a control device that adjusts the governor 7 to control an engine speed of the engine 1 and further controls the inverter apparatus 9 to control a torque of the assist power generation motor 2. The hydraulic pump 5, the hydraulic actuators 72, 74, 76, and the valve apparatus 12 constitute a hydraulic circuit. The actual engine speed of the engine 1 detected by the above-mentioned engine speed sensor $1a$, a torque of the engine 1 detected by the engine torque sensor $1b$, an amount of operation of each operation lever 17, and the like are inputted to the controller 11.

The hydraulic pump 5 is connected to the engine 1 through the assist power generation motor 2. The hydraulic pump 5 and the pilot hydraulic pump 6 are operated on driving force of the engine 1 and the assist power generation motor 2. A hydraulic oil discharged from the hydraulic pump 5 is supplied to the valve apparatus 12. A hydraulic oil discharged from the pilot hydraulic pump 6 is supplied to the operating device 4.

When an operator in the operator's cab 3 operates any operation lever 17 at this time, the operating device 4 supplies a hydraulic oil corresponding to an amount of operation of the operation lever 17 to the operating part of the valve apparatus 12 through the pilot pipe P. As a result, the position of a spool in the valve apparatus 12 is changed by the hydraulic oil and the hydraulic oil flowing from the hydraulic pump 5 and through the valve apparatus 12 is supplied to the hydraulic actuators 72, 74, 76. Consequently, the hydraulic actuators 72, 74, 76 are driven by the hydraulic oil supplied from the hydraulic pump 5 through the valve apparatus 12.

The hydraulic pump 5 includes, for example, a swash plate (not shown) as a variable displacement mechanism and adjusts an inclination angle of this swash plate to control a discharge flow rate of a hydraulic oil. In the following description, a swash plate pump will be taken as an example of the hydraulic pump 5. However, the hydraulic pump 5 may be a bent axis type pump or the like as long as the pump has a function of controlling a discharge flow rate of a hydraulic oil. Though not shown in the figures, the hydraulic pump 5 is provided with: a discharge pressure sensor detecting a discharge pressure of the hydraulic pump 5; a discharge flow rate sensor detecting a discharge flow rate of the hydraulic pump 5; and an inclination angle sensor measuring an inclination angle of the swash plate. The controller 11 is fed with a discharge pressure and a discharge flow rate of the hydraulic pump 5 and an inclination angle of the swash plate from these respective sensors to calculate a load on the hydraulic pump 5.

The pump displacement adjuster 10 adjusts a displacement (displacement volume) of the hydraulic pump 5 based on manipulate signals outputted from the controller 11. A specific description will be given. The pump displacement adjuster 10 includes: a regulator 13 inclinably supporting the swash plate; and an electromagnetic proportional valve 14 applying a control pressure to the regulator 13 according to a command value from the controller 11. On receiving a control pressure from the electromagnetic proportional valve 14, the regulator 13 changes an inclination angle of the swash plate by this control pressure. As a result, a displacement (displacement volume) of the hydraulic pump 5 is adjusted and thus an absorption torque (input torque) of the hydraulic pump 5 can be controlled.

The engine 1 is provided in an exhaust passage thereof with an exhaust gas purifying system purifying exhaust gas emitted from the engine 1. The exhaust gas purifying system includes: a selective catalytic reduction catalyst (SCR catalyst) 80 accelerating reduction reaction of nitrogen oxides in exhaust gas by ammonia produced from urea as a reducing agent; a reducing agent adding apparatus 81 adding urea into the exhaust passage of the engine 1; a urea tank 82 storing urea supplied to the reducing agent adding apparatus 81; and a muffler (silencer) 83 deadening an exhaust noise from the engine 1. Therefore, nitrogen oxides in exhaust gas of the engine 1 are purified into harmless water and nitrogen at the selective catalytic reduction catalyst 80 and then the exhaust gas is released into the atmosphere through the muffler 83.

The above-mentioned engine 1, assist power generation motor 2, inverter apparatus 9, and power storage apparatus 8 produce heat when continuously used. To suppress temperature rise in these apparatuses, a cooling apparatus is provided in the swiveling body 110. The swiveling body 110 is further provided therein with: a hydraulic oil temperature detection unit 60 measuring the temperature of a hydraulic oil discharged from the hydraulic pump 5; and an outside air temperature detection unit 61 measuring the outside air temperature in the vicinity of the hydraulic excavator.

Figure 3:
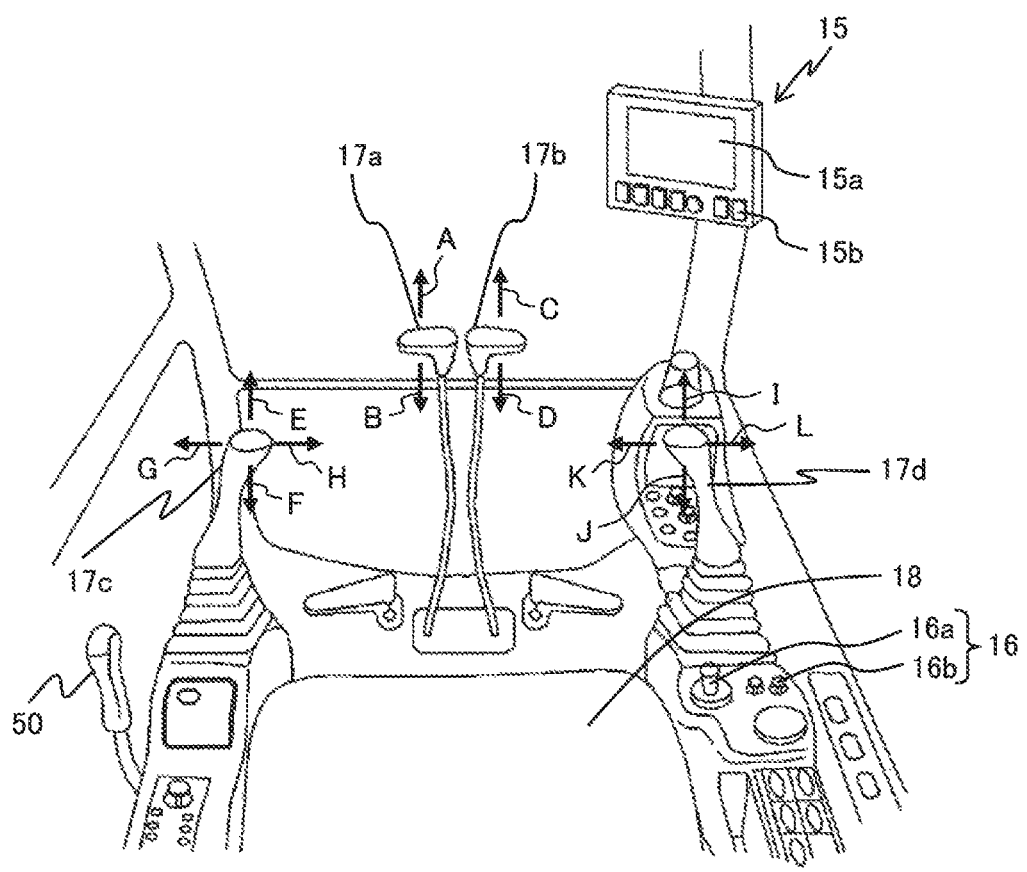
FIG. 3 is a drawing illustrating the configurations of operation levers and a display device in the operator's cab of a hybrid hydraulic excavator in an embodiment of the present invention.

FIG. 3 illustrates the configurations of operation levers and a display device in the operator's cab of a hybrid hydraulic excavator in an embodiment of the present invention.

As illustrated in FIG. 3, the operation levers 17a to 17d are grasped and used by an operator seated on an operator's seat 18 to manually operate the motion of the vehicle. The manipulate signals of each of these operation levers 17a to 17d are transmitted to the controller 11.

The operation lever 17a is located at the front left of the operator's seat 18. The operation lever 17a is operated forward (direction indicated by arrow A) to drive forward the left crawler 100a of the traveling body 100 (left crawler forward travel). The operation lever 17a is operated rearward (direction indicated by arrow B) to drive rearward the left crawler 100a of the traveling body 100 (left crawler rearward travel).

The operation lever 17b is located at the front right of the operator's seat 18. The operation lever 17b is operated forward (direction indicated by arrow C) to drive forward the right crawler 100a of the traveling body 100 (right crawler forward travel). The operation lever 17b is operated rearward (direction indicated by arrow D) to drive rearward the right crawler 100a of the traveling body 100 (right crawler rearward travel).

The operation lever 17c is located at the left of the operator's seat 18. The operation lever 17c is operated forward (direction indicated by arrow E) to swivel a swiveling apparatus 110a leftward (leftward swiveling) and is operated rearward (direction indicated by arrow F) to swivel the swiveling apparatus 110a rightward (rightward swiveling). The operation lever 17c is operated leftward (direction indicated by arrow G) to rotate the arm 73 upward (arm extend) and is operated rightward (direction indicated by arrow H) to rotate the arm 73 downward (arm bend).

The operation lever 17d is located at the right of the operator's seat 18. The operation lever 17d is operated forward (direction indicated by arrow I) to rotate the boom 71 downward (boom down) and is operated rearward (direction indicated by arrow J) to rotate the boom 71 upward (boom up). The operation lever 17d is operated leftward (direction indicated by arrow K) to rotate the bucket 75 downward (bucket digging) and is operated rightward (direction indicated by arrow L) to rotate the bucket 75 upward (bucket dumping).

The operator's cab 3 is provided with an operation lever state detection unit 19 detecting a state of operation of each operation lever 17a to 17d, that is, a position of each operation lever 17a to 17d. (Refer to FIG. 2.)

The display device 15 includes: a monitor 15a displaying information received from the controller 11; and operation switches 15b for operating the monitor 15a. The operation switches 15b include: a power switch for switching power to the monitor 15a between ON and OFF; a selector switch for changing a picture displayed on the monitor 15a when the power switch is ON; and the like.

A gate lock lever 50 located at the left of the operator's seat 18 is for switching the operation of the hydraulic excavator between enabled or disabled. When the gate lock lever 50 is tilted forward, the lever is actuated and the crawlers 100a, the swiveling apparatus 110a, the boom 71, the arm 73, and the bucket 75 are disabled even if any operation lever 17 is operated. The gate lock lever 50 is a safety device of the hydraulic excavator. To actuate the hydraulic excavator, the gate lock lever 50 is tilted rearward to disable the lever and then any operation lever 17 is operated. The operator's cab 3 is provided with a gate lock lever state detection unit 51 detecting a state of operation of the gate lock lever 50, that is, a position of the gate lock lever 50. (Refer to FIG. 2.)

The operator's cab 3 is further provided with an output setting unit 16 for setting an operating output of the hydraulic excavator. For example, the output setting unit 16 includes: an engine speed adjust dial 16a for adjusting an engine speed to set an operating output of the hydraulic excavator; and an output mode set switch 16b for setting an economy mode or a power mode. The engine speed adjust dial 16a and the output mode set switch 16b are used for an operator in the operator's cab 3 to select the setting of operating output of the vehicle, "low output" (suitable for light-load work) or "high output" (suitable for heavy-load work) according to the details of work the operator desires. A state of the output setting unit 16 is detected by an output state detection unit 16A and is inputted to the controller 11. (Refer to FIG. 2.)

Figure 4:
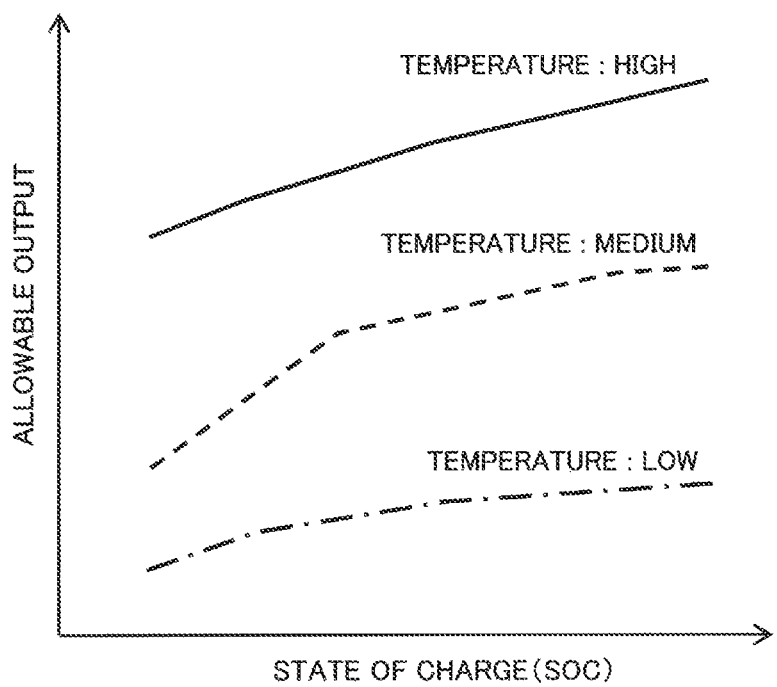
FIG. 4 is a drawing indicating the relation between the state of charge (SOC) and allowable output of a power storage apparatus of a hybrid hydraulic excavator in an embodiment of the present invention for each temperature of the power storage apparatus.

Since the power storage apparatus 8 has an upper-limit temperature under which the power storage apparatus can be used without a current limit, the power storage apparatus 8 must be cooled to prevent the temperature thereof from becoming excessively high. At a low temperature, the power storage apparatus 8 is reduced in allowable output. FIG. 4 indicates a relation between a state of charge (SOC) and an allowable output of the power storage apparatus 8 for each temperature (low temperature, medium temperature, high temperature) of the power storage apparatus 8. As indicated in FIG. 4, the power storage apparatus 8 is reduced in allowable output at a low temperature. Therefore, to use the power storage apparatus 8 without drop in allowable output, the power storage apparatus 8 must be warmed to a predetermined temperature or higher. That is, the power storage apparatus 8 must be kept within an appropriate temperature range by warming up the power storage apparatus 8. In particular, when the hydraulic excavator is started up in the winter season when the outside air temperature is low or on other like occasions, it may be advisable to previously warm up the power storage apparatus 8 to increase an allowable output of the power storage apparatus 8 before the work is started.

Figure 5:
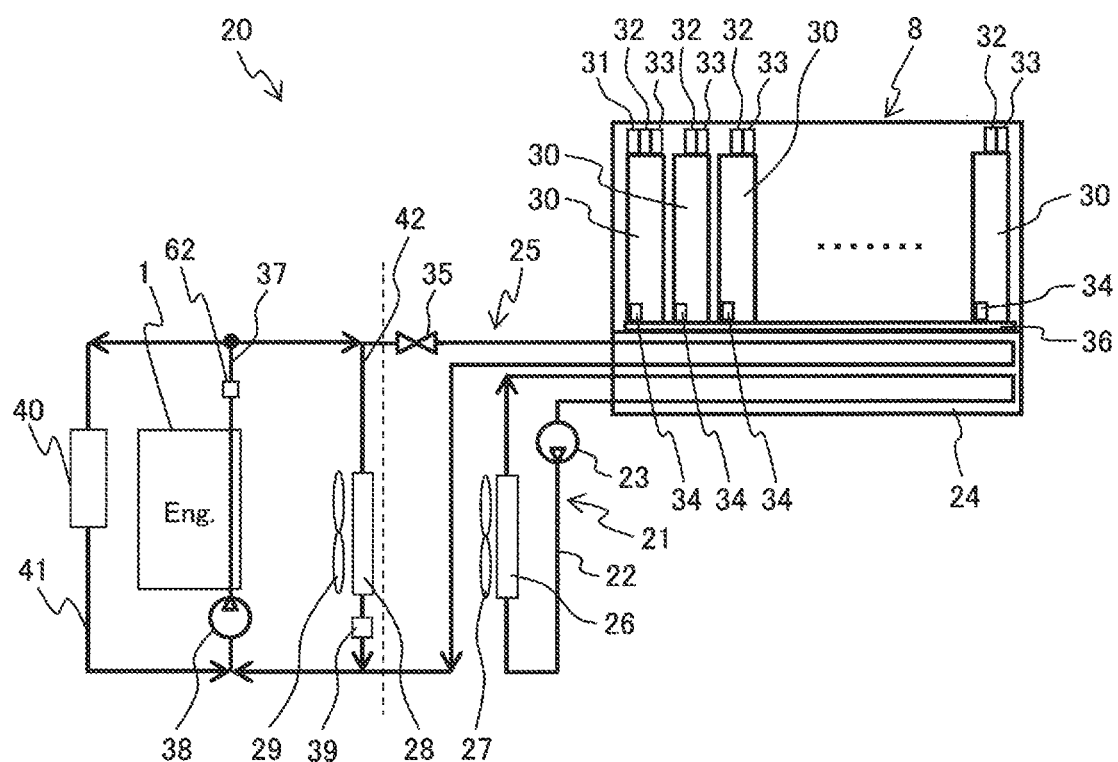
FIG. 5 is a drawing illustrating the configuration of a temperature control device in an embodiment of the present invention.

FIG. 5 illustrates a configuration of a temperature control device in an embodiment of the present invention. The temperature control device 20 is for cooling or warming up the power storage apparatus 8 to keep the power storage apparatus 8 within an appropriate temperature range.

As illustrated in FIG. 5, the temperature control device 20 includes: a cooling circuit 21 for circulating a cooling medium, such as cooling water, in the vicinity (location where heat can be transferred) of the power storage apparatus 8 to cool the power storage apparatus 8; and a warm-up circuit 25 for circulating a warming medium, such as engine coolant, in the vicinity (location where heat can be transferred) of the power storage apparatus 8 to warm up the power storage apparatus 8.

The cooling circuit 21 includes: a liquid pipe 22 through which a cooling medium flows; a pump 23 circulating a cooling medium in the liquid pipe 22; a water jacket 24 as a heat exchange member exchanging heat between the power storage apparatus 8 and a cooling medium; and a battery radiator 26 causing heat exchange between a cooling medium and the outside air. The apparatuses constituting the cooling circuit 21 are annularly connected through the liquid pipe 22. A blast fan 27 is attached to the battery radiator 26 for taking the outside air into the swiveling body 110 to cool a cooling medium and the like.

The warm-up circuit 25 includes: a liquid pipe 37 through which a warming medium (engine coolant) warmed by cooling the engine 1 flows; a pump 38 circulating a warming medium in the liquid pipe 37; the water jacket 24 as a heat exchange member causing heat exchange between the power storage apparatus 8 and a warming medium; and a control valve 35 selecting whether or not to let a warming medium through the water jacket 24. The apparatuses constituting the warm-up circuit 25 are annularly connected through the liquid pipe 37. The liquid pipe 37 is provided with an engine coolant temperature detection unit 62 measuring the temperature of a warming medium warmed by the engine 1.

A heating circuit 41 and an engine cooling circuit 42 are provided in parallel with the warm-up circuit 25. The operator's cab 3 can be heated by circulating a warming medium through a heater core 40 provided in the heating circuit 41. The engine cooling circuit 42 is provided with: an engine radiator 28 causing heat exchange between a warming medium (engine coolant) and the outside air; and a thermostat 39 that circulates a warming medium to the engine cooling circuit 42 when a warming medium (engine coolant) reaches a predetermined temperature or higher. A blower fan 29 is attached to the engine radiator 28 for taking the outside air into the swiveling body 110 to cool a warming medium (engine coolant).

It is desirable that the power storage apparatus 8 should be covered with a protection cover or the like for preventing damage due to the ingress of dust, water, or the like.

The pump 23 provided in the cooling circuit 21 is an electric pump and is ON/OFF-controlled by the controller 11. The pump 38 located in the warm-up circuit 25 is a pump that is directly coupled to the engine 1 and is constantly operated in conjunction with driving of the engine 1. The pump 38 in the warm-up circuit 25 may be an electric pump like the pump 23 in the cooling circuit 21. In this case, the control valve 35 is not installed in the warm-up circuit 25 and it can be selected whether or not to circulate a warming medium through the water jacket 24 by controlling turn-ON/OFF or a flow rate of the electric pump.

The control valve 35 is a normally closed valve that is opened when the valve is turned ON and is ON/OFF-controlled by the controller 11. When the control valve 35 is turned OFF, the valve is closed and a warming medium is not circulated to the water jacket 24. In this case, the power storage apparatus 8 is not warmed up. When the control valve 35 is turned ON, the valve is opened and a warming medium is circulated to the water jacket 24. In this case, the power storage apparatus 8 is warmed up. The control valve 35 may be not such an ON/OFF valve as mentioned above and may be a proportional valve capable of controlling a flow rate.

The power storage apparatus 8 includes, for example, a plurality of battery cells (power storage cells) 30 arranged in series along the water jacket 24. These battery cells 30 are fixed in thermal coupling in the water jacket 24 through a heat conduction sheet 36. Each battery cell 30 includes a rectangular lithium ion secondary battery. However, each battery cell 30 may be any other battery or a capacitor. For example, a nickel hydrogen battery, a nickel cadmium battery, or the like may be used instead of a lithium ion secondary battery.

There are attached: a current sensor 31 as a current measuring unit measuring a current passed through the power storage apparatus 8; a voltage sensor 32 as a voltage measuring unit measuring a voltage of each battery cell 30; an upper temperature sensor 33 as an upper temperature measuring unit measuring an upper temperature of each battery cell 30; and a lower temperature sensor 34 as a lower temperature measuring unit measuring a lower temperature of each battery cell 30.

Voltages and temperatures acquired from a plurality of the sensors are processed at the controller 11 and an average value, a maximum value, and a minimum value of voltage and temperature at the power storage apparatus 8 are calculated from the measured values of voltage and temperatures of each battery cell 30. The controller 11 then calculates a power storage amount of the power storage apparatus 8 based on a current measured by the current sensor 31, voltages measured by the voltage sensors 32, temperatures measured by the upper temperature sensors 33, temperatures measured by the lower temperature sensors 34, and the like. The controller 11 manages a power storage amount of the power storage apparatus 8 based on the calculated power storage amount. Further, the controller 11 calculates a state of charge (SOC) from, for example, the calculated power storage amount of the power storage apparatus 8.

The voltage sensor 32, the upper temperature sensor 33, and the lower temperature sensor 34 need not be installed in all the battery cells 30 as shown in FIG. 5 and a voltage and a temperature only have to be capable of being measured at a representative point. The lower temperature sensor 34 is provided for measuring the temperature of the lower part of each battery cell 30 but may be installed in the water jacket 24 in proximity of a battery cell 30 because of a restriction in terms of installation. As described later, the lower temperature sensors 34 are used to obtain a temperature difference between the upper and lower parts of each battery cell 30. For this reason, it is desirable that a lower temperature sensor 34 should be installed in a battery cell 30 with an upper temperature sensor 33 installed. In the following description, a temperature difference between the upper and lower parts of a battery cell 30 may be explained as a temperature variation in the battery cell 30.

In FIG. 5, the fan 27 and the fan 29 are depicted as different fans but the present invention may be configured to send air both to the battery radiator 26 and to the engine radiator 28 by a single fan. The fans 27, 29 are directly driven by the engine 1.

The water jacket 24 is formed of a thin plate-like metal member and has a flow path for circulating a cooling medium and a warming medium. Though not shown in the drawing, the water jacket 24 includes: a cooling medium inlet through which a cooling medium flows in; a groove that is formed in the interior and is for circulating a cooling medium that flowed in through the cooling medium inlet; a cooling medium outlet through which a cooling medium circulated in the groove flows out; a warming medium inlet through which a warming medium flows in; a groove that is formed in the interior and is for circulating a warming medium that flowed in through the warming medium inlet; and a warming medium outlet through which a warming medium circulated in the groove flows out. A cooling medium and a warming medium circulated in the water jacket 24 transfer heat to and from each battery cell 30 through the heat conduction sheet 36.

Since the water jacket 24 is a metal member as mentioned above, there is a potential difference between individual adjoining battery cells 30. For this reason, if a battery cell 30 is brought into direct contact with the water jacket 24, a large short-circuit current would flow. The heat conduction sheet 36 placed between the battery cells 30 and the water jacket 24 has a function of avoiding such a short-circuit current (insulating function). The heat conduction sheet 36 electrically insulates the battery cells 30 and the water jacket 24 from each other and causes efficient heat exchange between the battery cells 30 and the water jacket 24. The heat conduction sheet 36 is formed of an elastic body. For this elastic body, for example, a silicone resin sheet, a plastic sheet filled with a filler excellent in thermal conduction, mica, or the like can be used. However, any other material may be used as long as the material has the same functions as these materials (members).

In the above example, engine coolant warmed by cooling the engine 1 is used as a warming medium. However, any other material may be used as long as the material brings about the same effect. For example, a medium warmed by on-board equipment, such as the heater, the assist power generation motor 2, or the inverter apparatus 9, may be used.

The controller 11 shown in FIG. 2 has a function of a control device for the temperature control device 20 that cools or warms up the power storage apparatus 8 to keep the apparatus within an appropriate temperature range. As mentioned above, warm-up operation for the power storage apparatus 8 in this embodiment is performed by a warming medium.

Figure 6:
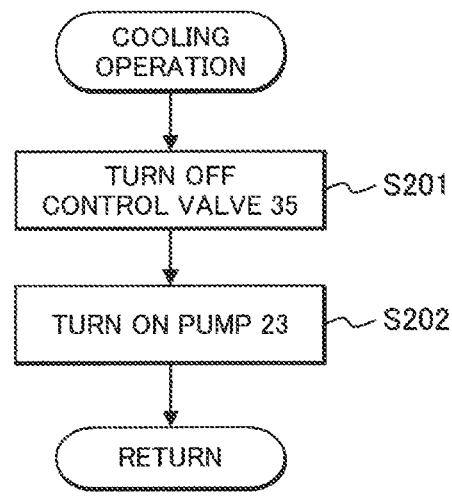
FIG. 6 is a flowchart explaining the overview of cooling operation of a temperature control device in an embodiment of the present invention.
Figure 7:
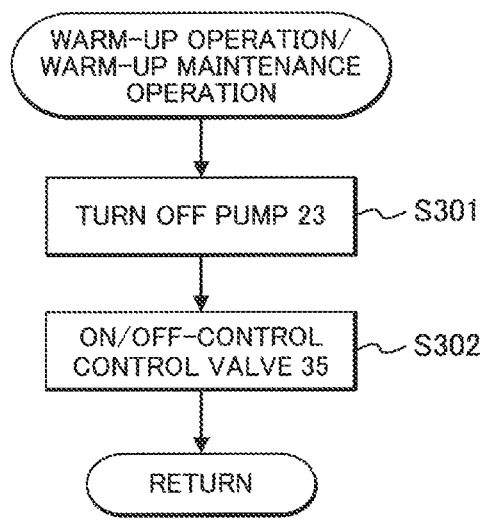
FIG. 7 is a flowchart explaining the overview of warm-up operation of a temperature control device in an embodiment of the present invention.
Figure 8:
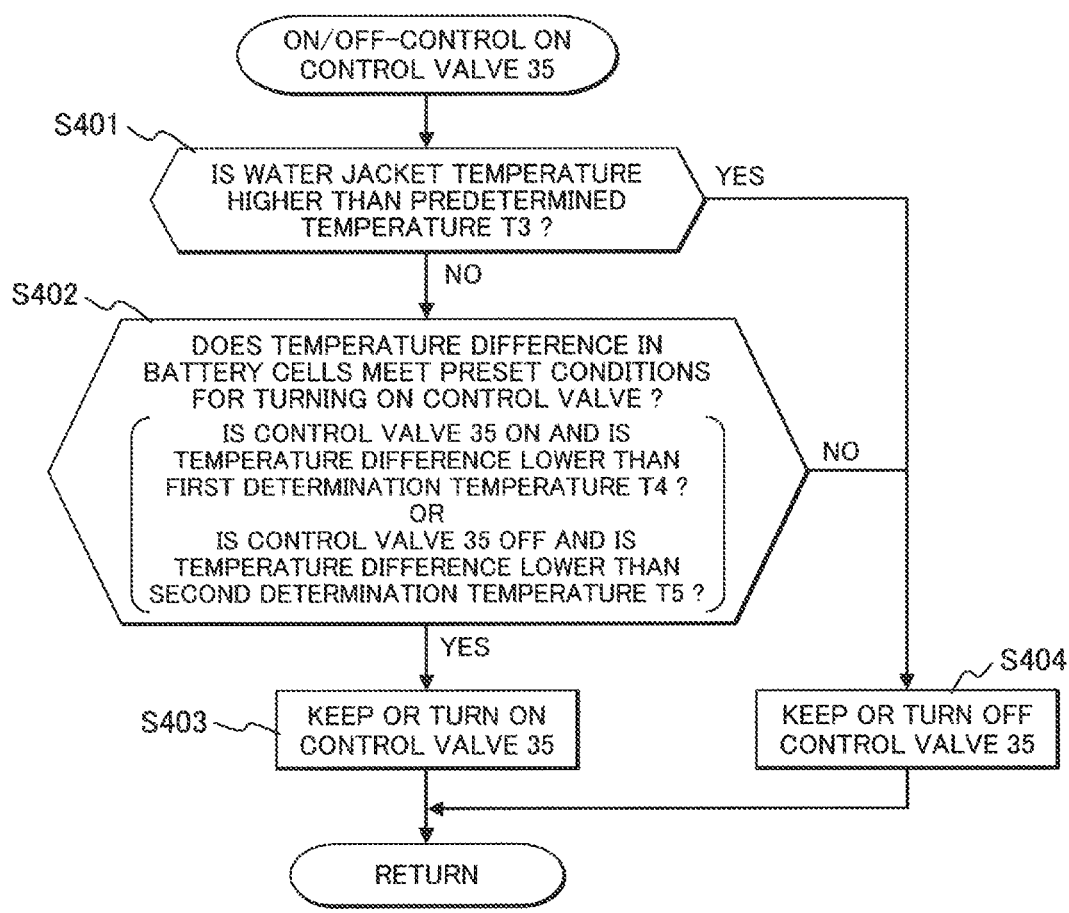
FIG. 8 is a flowchart explaining the overview of the ON/OFF-control of a control valve in warm-up operation of a temperature control device in an embodiment of the present invention.

A description will be given to the overview of operations of the temperature control device 20 in this embodiment with reference to FIG. 6, FIG. 7, and FIG. 8. FIG. 6 is a flowchart illustrating the overview of cooling operation of a temperature control device in an embodiment of the present invention. FIG. 7 is a flowchart illustrating the overview of warm-up operation of a temperature control device in an embodiment of the present invention. FIG. 8 is a flowchart illustrating the overview of ON/OFF-control on a control valve in warm-up operation of a temperature control device in an embodiment of the present invention.

There are two cases where temperature control is performed on the power storage apparatus 8: a case where a cooling medium to which heat is transferred from the power storage apparatus 8 is cooled by the battery radiator 26 (cooling operation) and a case where the apparatus is warmed up by a warming medium warmed by engine waste heat (warm-up operation). The operation of the temperature control device 20 is varied according to the temperature of the power storage apparatus 8. The operations shown in FIG. 6, FIG. 7, and FIG. 8 are repeatedly performed by measuring temperature, voltage, and current at predetermined time intervals.

A description will be given to the overview of cooling operation for the power storage apparatus 8 by the controller 11 in this embodiment with reference to the flowchart in FIG. 6. The cooling operation is performed when the maximum temperature of the power storage apparatus 8 measured by a plurality of the upper temperature sensors 33 is higher than a predetermined temperature T1.

At S201, the control valve 35 is turned OFF to prevent a warming medium from being circulated in the water jacket 24. As a result, heat of the warming medium is not transferred to the power storage apparatus 8.

At S202, subsequently, the pump 23 is turned ON to circulate the cooling medium in the water jacket 24. At this time, heat produced in the power storage apparatus 8 is transferred to a cooling medium flowing through the water jacket 24. The cooling medium warmed in the water jacket 24 is supplied to the battery radiator 26 and is cooled there.

To control the temperature of the power storage apparatus 8, a flow rate of the cooling medium discharged from the pump 23 or a quantity of the outside air sent by the fan 27 can be adjusted. Needless to add, both a flow rate of the cooling medium and a quantity of the outside air sent may be adjusted.

A specific description will be given. When the temperature of the power storage apparatus 8 measured by the upper temperature sensors 33 is high, a flow rate of the cooling medium discharged from the pump 23 or a quantity of the outside air sent by the fan 27 only has to be increased. When the temperature of the power storage apparatus 8 measured by the upper temperature sensors 33 is low, a flow rate of the cooling medium discharged from the pump 23 or a quantity of the outside air sent by the fan 27 only has to be reduced.

A description will be given to the overview of warm-up operation for the power storage apparatus 8 by the controller 11 in this embodiment with reference to the flowchart in FIG. 7. The warm-up operation is performed when the minimum temperature of the power storage apparatus 8 measured by a plurality of the upper temperature sensors 33 is lower than a predetermined temperature T2.

The temperature T2 is the warm-up target temperature described later.

At S301, the pump 23 is turned OFF to prevent a cooling medium from being circulated in the water jacket 24. As a result, heat of the power storage apparatus 8 can be prevented from escaping from the water jacket 24 to the cooling medium. At S302, subsequently, the control valve 35 is ON/OFF-controlled. The details of control on the control valve 35 will be described later.

As mentioned above, the temperature control device 20 is operated to cool or warm up the power storage apparatus 8 to keep the apparatus within an appropriate temperature range. However, when the minimum temperature of the upper temperature sensors 33 is not lower than T2 and the maximum temperature thereof is not higher than T1, neither cooling operation nor warm-up operation is performed. In this case, the pump 23 is turned OFF and the control valve 35 is turned OFF.

A description will be given to the ON/OFF-control on the control valve 35 at S302 with reference to the flowchart in FIG. 8. This control is for switching whether or not to circulate a warming medium in the water jacket 24.

At S401, it is determined whether the temperature of the lower temperature sensors 34 is higher than a preset predetermined temperature T3. When it is determined at S401 that the lower temperature of a battery cell 30 is higher than T3, at S404, the control valve 35 is turned OFF to stop warm-up operation by the warming medium. This is intended to prevent the lower part of the battery cell 30 from becoming excessively high. When at S401, the lower temperature of a battery cell 30 is not higher than the predetermined temperature T3, at S402, it is determined whether a temperature difference in battery cells, which is a difference in temperature between the upper part and the lower part of a battery cell 30, is higher or lower than a preset temperature. When the control valve 35 is ON and the temperature difference in battery cells at S402 is lower than a first determination temperature T4, the operation proceeds to S403 and the control valve 35 is kept ON. When the control valve 35 is ON and the temperature difference in battery cells at S402 is not lower than the first determination temperature T4, at S404, the control valve 35 is turned OFF to stop warm-up operation by the warming medium.

When the control valve 35 is OFF and the temperature difference in battery cells at S402 is lower than a second determination temperature T5, the operation proceeds to S403 and the control valve 35 is turned ON. When the control valve 35 is OFF and the temperature difference in battery cells at S402 is not lower than the second determination temperature T5, at S404, the control valve 35 is kept OFF. The first determination temperature T4 is set to a temperature higher than the second determination temperature T5.

The reason why turn-ON/OFF of the control valve 35 is switched according to a temperature difference in battery cells is that a variation in temperature in the battery cells 30 is suppressed. A temperature variation in a battery cell 30 causes a variation in the internal resistance of the battery cell 30. If a variation in internal resistance is produced, each battery cell 30 is divided into a portion where a current is prone to flow and a portion where a current is less prone to flow and this can accelerate deterioration in a battery.

It is desirable that as the lower temperature of the battery cells 30 used in determination at S401, the maximum temperature among a plurality of the lower temperature sensors 34 should be used. It is more desirable that a temperature should be measured in the vicinity of the warming medium inlet of the water jacket 24 where lower temperature is highest. It is desirable that as the temperature difference in battery cells used in determination at S402, a temperature difference in a cell in which the temperature difference is maximized among all the measuring points should be used. It is more desirable that a temperature difference in battery cells should be measured in the vicinity of the warming medium inlet of the water jacket 24 where the temperature difference in battery cells is maximized. As mentioned above, a temperature difference in battery cells only has to be measured from the upper temperature and the lower temperature of a battery cell 30 in proximity to the warming medium inlet of the water jacket 24; therefore, a number of measuring points for lower temperature can be reduced.

As mentioned above, the control valve 35 is ON/OFF-controlled to prevent the lower part of a battery cell 30 from being brought to a high temperature and further suppress a variation in temperature in each battery cell 30.

Even in a low-temperature environment in which the above-mentioned warm-up operation is performed, there is a large difference between the minimum temperature of the power storage apparatus 8 and the temperature T2 immediately after the hydraulic excavator is actuated. For this reason, the power storage apparatus 8 must be quickly warmed up. Meanwhile, there are cases where the hydraulic excavator has not been just actuated and the minimum temperature of the power storage apparatus 8 once reaches the predetermined temperature T2 and then the temperature of the power storage apparatus 8 drops. In such cases, there is a small difference between the minimum temperature of the power storage apparatus 8 and the temperature T2. For this reason, in warm-up operation, the temperature of the power storage apparatus 8 can be raised to the temperature T2 more quickly than immediately after start-up. Consequently, warm-up of the power storage apparatus 8 immediately after the hydraulic excavator is actuated will be designated as warm-up operation and warm-up on other occasions than immediately after start-up will be designated as warm-up maintenance operation.

The reason why a temperature variation is prone to occur in a battery cell 30 in warm-up operation by a warming medium is that the lower part of the battery cell 30 at a low temperature is warmed by the warming medium as shown in FIG. 5. It is desired that a side portion and the upper part of each battery cell 30 could be warmed by a warming medium but it is difficult because of a structural restriction of the power storage apparatus 8. For this reason, the temperature of the lower part of a battery cell 30 is higher than the temperature of the upper part. In this embodiment, a temperature difference in battery cells becomes large (becomes equal to or higher than the first determination temperature T4), the control valve 35 is turned OFF. When the control valve 35 is turned OFF, circulation of the warming medium is stopped. While the control valve 35 is OFF, heat is transferred from the lower part to the upper part of a battery cell 30 and the temperature of the upper part of the battery cell 30 is raised. As a result, the temperature difference in battery cells is reduced. Further, when the temperature of the upper part of a battery cell 30 is lower than the predetermined temperature T2, the control valve 35 is turned ON again. The control valve 35 is repeatedly turned ON/OFF as mentioned above and warm-up is terminated when the battery cell 30 reaches the predetermined temperature T2.

When the hydraulic excavator is halted after warm-up of the power storage apparatus 8 is terminated as mentioned above, the temperature of a battery cell 30 drops again and the battery cell 30 will be warmed up again (warm-up maintenance operation). Also, in this case, the control valve 35 is repeatedly turned ON/OFF.

The control valve 35 has a predetermined guaranteed number of times of operation and it is necessary to reduce a number of times of operation as much as possible to lengthen a life thereof. In the above example, an ON/OFF valve is used as the control valve 35. Even when a proportional valve is used instead, flow rate adjustment must be similarly made. Even when an electric pump is adopted in place of the control valve 35, flow rate adjustment will be made. That is, for equipment, such as a proportional valve and a pump, involving flow rate adjustment on a warming medium like the control valve 35, the number of times of operation thereof must be reduced as much as possible.

Figure 9:
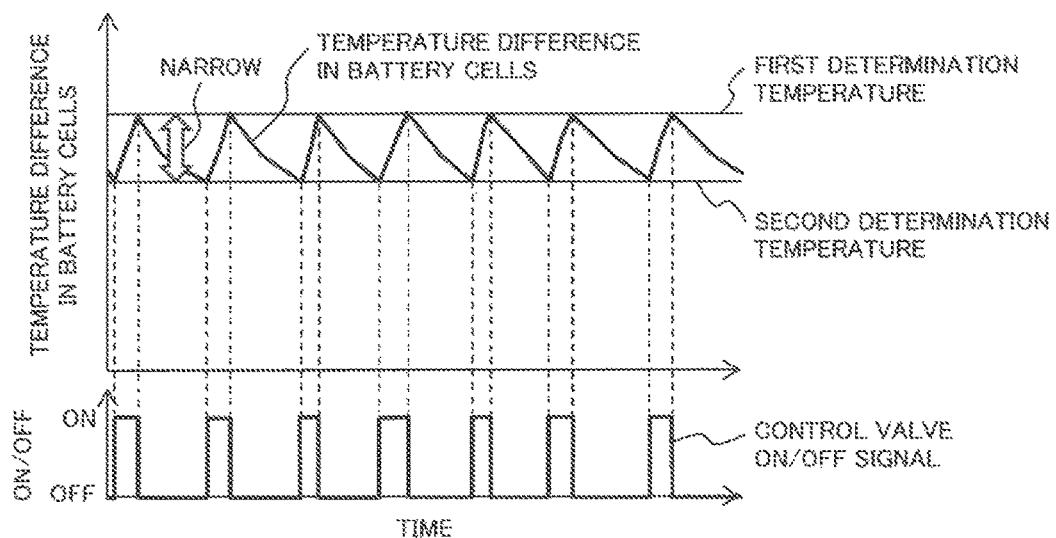
FIG. 9 is a drawing indicating a relation between a temperature difference in battery cells and an ON/OFF signal of a control valve in an embodiment of the present invention.

Turn ON/OFF of the electromagnetic valve 35 is switched depending on whether or not a temperature difference between the upper part and the lower part of a battery cell 30 is a preset temperature as shown at S402 in FIG. 8. FIG. 9 explains a relation between a temperature difference in battery cells and a control valve ON/OFF signal in an embodiment of the present invention.

The control valve 35 is switched from ON to OFF when the temperature difference in battery cells reaches the first determination temperature T4; and the control valve is switched from OFF to ON when the temperature difference in battery cells reaches the second determination temperature T5. When the first determination temperature T4 is high, a temperature difference in battery cells is increased and this has an influence on a life of the power storage apparatus 8. When there is a small difference between the first determination temperature T4 and the second determination temperature T5, a number of times of turning ON/OFF the electromagnetic valve 35 is increased and at the same time, the ON duration of the control valve is lengthened. This has an influence on a life of the electromagnetic valve 35. However, when the first determination temperature T4 is high and there is a small difference between the first determination temperature T4 and the second determination temperature T5, the ON duration of the control valve 35 is lengthened. As a result, the amount of heat transferred from the warming medium to the power storage apparatus 8 is increased and the power storage apparatus 8 can be warmed up quickly.

Figure 10:
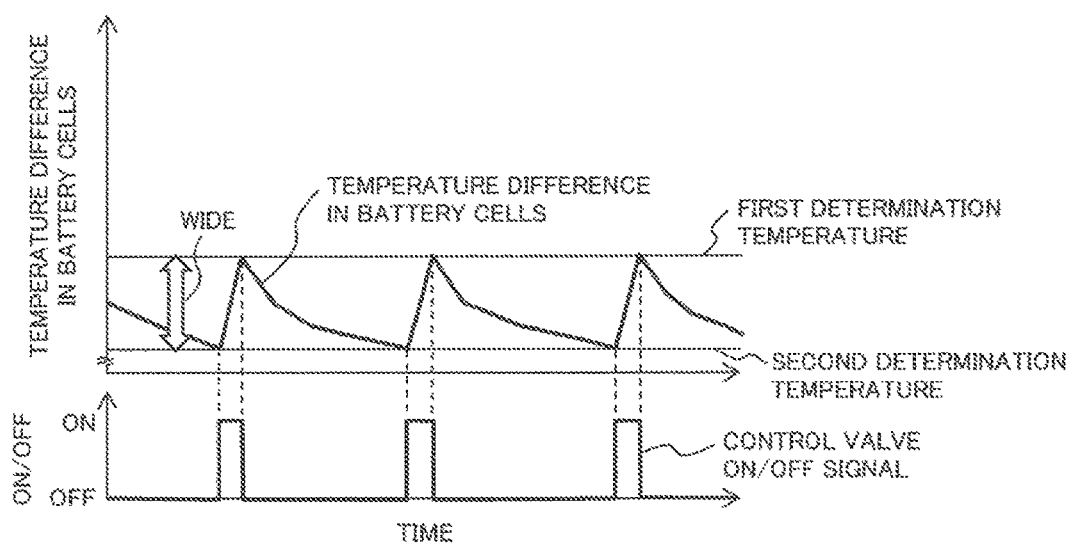
FIG. 10 is a drawing indicating another relation between a temperature difference in battery cells and an ON/OFF signal of a control valve in an embodiment of the present invention.

FIG. 10 indicates a relation between a temperature difference in battery cells and a control valve 35 ON/OFF signal when the first determination temperature T4 is low and there is a large difference between the first determination temperature T4 and the second determination temperature T5. FIG. 10 is a drawing explaining another relation between a temperature difference in battery cells and a control valve ON/OFF signal in an embodiment of the present invention.

It can be seen that in FIG. 10, the number of times of operation of the control valve 35 is reduced and the operating time is also reduced as compared with FIG. 9. As a result, a temperature difference in battery cells can be reduced and thus a life of the power storage apparatus 8 can be lengthened. Since a number of times of operation of the control valve 35 can be reduced, a life of the control valve 35 can be lengthened. However, as the result of the ON duration of the control valve 35 being shortened, an amount of heat transferred from the warming medium to the power storage apparatus 8 is reduced and a time required for warming up the power storage apparatus 8 is lengthened. Consequently, in this embodiment, a first determination temperature and a second determination temperature are varied according to a state of the vehicle.

As indicated in FIG. 4, an allowable output of the power storage apparatus 8 is determined according to temperature. That is, it is unnecessary to warm the power storage apparatus 8 beyond a vehicle output request. Consequently, a temperature corresponding to a vehicle output request is taken as a target temperature of the power storage apparatus 8 to be warmed up.

As mentioned above, in this embodiment, a temperature corresponding to a vehicle output request is taken as a target temperature for warm-up in accordance with a state of the vehicle. In addition, a first determination temperature and a second determination temperature at which turn-ON/OFF of the control valve 35 is switched is varied according to a state of the vehicle. That is, operation is divided into a case where the power storage apparatus 8 is warmed up quickly (warm-up priority) and a case where a number of times of operation of the control valve 35 is reduced (life priority). In other words, this embodiment is provided with a warm-up priority mode in which a higher priority is given to warm-up and another warm-up mode (normal warm-up mode) and is provided as a normal warm-up mode with a life priority mode in which a higher priority is given to a life of the control valve 35.

Figure 11:
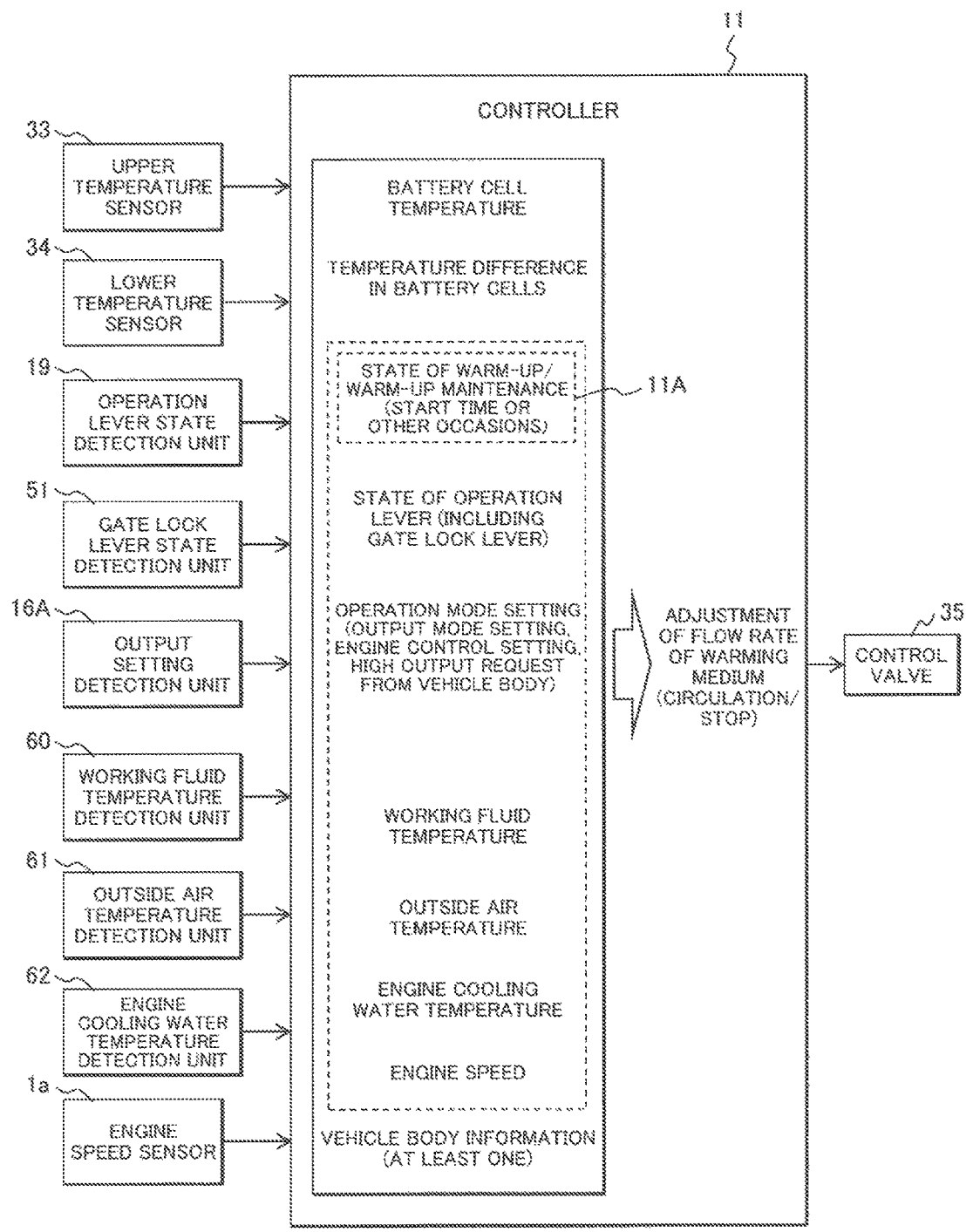
FIG. 11 is a drawing illustrating a controller regulating a flow rate of a warming medium in an embodiment of the present invention.

FIG. 11 is a block diagram of a controller 11 adjusting a flow rate of a warming medium according to the present invention. FIG. 11 illustrates a controller adjusting a flow rate of a warming medium in an embodiment of the present invention.

The controller 11 changes a method for adjusting a flow rate of a warming medium (ON/OFF-control on the control valve 35) according to input information, including a state of warm-up/warm-up maintenance, states of the operation levers, an operation mode setting, a hydraulic oil temperature, an outside air temperature, an engine coolant temperature, and an engine speed, as vehicle information detected by: the upper temperature sensors 33, the lower temperature sensors 34, the operation lever state detection unit 19, the output state detection unit 16A, the hydraulic oil temperature detection unit 60, the outside air temperature detection unit 61, the engine coolant temperature detection unit 62, and the engine speed sensor 1a as vehicle state detection units. Specifically, it is determined from these pieces of vehicle information whether the present situation is a case where the power storage apparatus 8 should be warmed up quickly (warm-up priority) or a case where a number of times of operation of the control valve 35 should be reduced (life priority). Then a warm-up target temperature (T2) for the battery cells and determination temperatures (first determination temperature and second determination temperature) for temperature difference in battery cells are varied. The control valve 35 adjusting a flow rate of a warming medium is controlled according to a battery cell temperature and a temperature difference in battery cells based on a warm-up target temperature of the battery cells 30 and determination temperatures for temperature difference in battery cells set at the controller 11 in accordance with the flowchart in FIG. 8.

The battery cell temperature is the minimum temperature of the power storage apparatus 8 measured by a plurality of the upper temperature sensors 33.

The temperature difference in battery cells is a value obtained by subtracting an upper temperature of a battery cell measured by an upper temperature sensor 33 from a lower temperature of the battery cell measured by a lower temperature sensor 34.

As mentioned above, as states of warm-up/warm-up maintenance, there are a state of warm-up operation immediately after the vehicle is actuated and a state of another warm-up operation (warm-up maintenance operation). A state of warm-up/warm-up maintenance is detected by determination at the warm-up operation state determination unit (warm-up operation state detection unit) 11A of the controller 11 based on the minimum temperature of the power storage apparatus 8 measured by the upper temperature sensors 33.

A state of each operation lever is detected from a signal detected by the operation lever state detection unit 19 and a signal detected by the gate lock lever state detection unit 51.

Operation mode setting is equivalent to a signal obtained by detecting the setting of the output setting unit 16 including the engine adjust dial 16a and the output mode set switch 16b by the output setting detection unit 16A. In this embodiment, the output setting unit 16 constitutes an engine speed setting unit for setting an engine speed of the engine (prime mover). The output state detection unit 16A constitutes an engine set speed detection unit that detects a set engine speed of the engine set based on a setting of the engine adjust dial 16a and/or the output mode set switch 16b.

A hydraulic oil temperature is a temperature of a hydraulic oil for driving the hydraulic actuators 72, 74, 76 and is detected by the hydraulic oil temperature detection unit 60.

An outside air temperature is detected by the outside air temperature detection unit 61. The outside air temperature detection unit 61 is, for example, an intake air temperature sensor of the engine or a temperature sensor of the air conditioner but may be anything as long as it can detect an outside air temperature.

An engine coolant temperature is a temperature of a warming medium heated by waste heat of the engine 1 and is detected by the engine coolant temperature detection unit 62 that is also a warming medium temperature detection unit.

An engine speed is the actual engine speed of the engine 1 detected by the engine speed sensor 1a as the above-mentioned prime mover speed detection unit.

A description will be given to a determination of whether to switch between a case where the power storage apparatus 8 should be warmed up quickly (warm-up priority) and a case where a number of times of operation of the control valve 35 should be reduced (life priority). FIG. 12 indicates how a flow rate of a warming medium is adjusted according to a state of the vehicle in an embodiment of the present invention.

First, a description will be given to a determination based on a state of warm-up/warm-up maintenance. As mentioned above, warm-up operation is an operation performed immediately after the vehicle is actuated and, in this operation, there is a large difference between the temperature of the power storage apparatus 8 and a warm-up target temperature; therefore, it is desired to warm the power storage apparatus 8 quickly and thus warm-up priority is taken. In warm-up maintenance operation, meanwhile, there is a small difference between the temperature of the power storage apparatus 8 and a warm-up target temperature; therefore, life priority is taken to reduce a number of times of operation of the control valve 35.

A description will be given to a determination based on a state of each operation lever. When the gate lock lever is OFF or any operation lever 17 is operated by an operator, it is desired to warm the power storage apparatus 8 quickly; therefore, warm-up priority is taken. Meanwhile, when the gate lock lever is ON or an operator does not operate any operation lever 17 and the front work equipment 70 is not in warm-up operation, it means that an operator need not operate the hydraulic excavator quickly. In this case, a warm-up time (time required for warm-up) may be long. Therefore, life priority is taken to reduce a number of times of operation of the control valve 35.

A description will be given to a determination based on a state of operation mode setting. When the output mode setting is power mode or a setting of engine speed is high, an operator wants a high output. In this case, it is desired to warm the power storage apparatus 8 quickly; therefore, warm-up priority is taken. Meanwhile, when the output mode setting is economy mode or a setting of engine speed is low, it means that an operator does not want a high output. In this case, a warm-up time may be long; therefore, life priority is taken to reduce a number of times of operation of the control valve 35. A determination of whether warm-up priority or life priority should be taken may be performed according to an output request for the power storage apparatus 8 from the vehicle.

A description will be given to a determination based on a hydraulic oil temperature. When a hydraulic oil temperature is high, it means that the front work equipment 70 can be smoothly operated and there is a high output request for the power storage apparatus 8. For this reason, warm-up priority is taken to warm the power storage apparatus 8 quickly. When a hydraulic oil temperature is low, meanwhile, the front work equipment 70 cannot be smoothly operated and there is no high output request for the power storage apparatus 8; therefore, life priority is taken to reduce a number of times of operation of the control valve 35. This determination may be made based on a difference between the temperature of the power storage apparatus 8 and a hydraulic oil temperature. A more specific description will be given. When the temperature of the power storage apparatus 8 is lower than a hydraulic oil temperature, warm-up priority is taken to warm the power storage apparatus 8 quickly. Meanwhile, when the temperature of the power storage apparatus 8 is higher than a hydraulic oil temperature, life priority is taken to reduce a number of times of operation of the control valve 35.

A description will be given to a determination based on an outside air temperature. When an outside air temperature is low, the initial temperature of each battery cell 30 is low and an amount of heat radiated from the battery cells 30, the water jacket 24, and the like is large and thus a warm-up time (time required for warm-up) is lengthened. For this reason, warm-up priority is taken to warm the power storage apparatus 8 quickly. Meanwhile, when an outside air temperature is high, a warm-up time is short; therefore, life priority is taken to reduce a number of times of operation of the control valve 35. As mentioned above, an outside air temperature relates to a state of the vehicle that lengthens or shortens a warm-up time. For this reason, the outside air temperature detection unit 61 including an intake air temperature sensor or a temperature sensor of the air conditioner constitutes one of the vehicle state detection units detecting a state of the vehicle.

A description will be given to a determination based on an engine coolant temperature. When an engine coolant temperature is high, it is desired to warm the power storage apparatus 8 quickly; therefore, warm-up priority is taken. Meanwhile, when an engine coolant temperature is low, a warm-up time may be long; therefore, life priority is taken to reduce a number of times of operation of the control valve 35.

A description will be given to a determination based on an engine speed. This is not the above-mentioned engine speed setting but is an actual engine speed. Since there are cases where an engine speed is different from an engine speed setting because of warm-up of the engine and the like, this item is taken as one of pieces of input information. When an engine speed is high, a high output is requested and it is desired to warm the power storage apparatus 8 quickly; therefore, warm-up priority is taken. Meanwhile, when an engine speed is low, it means that a high output is not requested and a warm-up time may be long; therefore, life priority is taken to reduce a number of times of operation of the control valve 35.

As mentioned above, switching is performed between a case where the power storage apparatus 8 is warmed quickly (warm-up priority) and a case where a number of times of operation of the control valve 35 is reduced (life priority) according to a state of the vehicle. As vehicle information as input information, all the items listed in FIG. 12 need not be used but at least one is used for determination. When a determination based on one state of the vehicle among a plurality of states of the vehicle is warm-up priority, warm-up priority is taken. This is because even if this determination is erroneous, this erroneous determination would not have a great influence on a life of equipment. Conversely, if life priority is taken in defiance of a determination of warm-up priority based on the one state of the vehicle, a problem would arise. If this determination of life priority is erroneous, warm-up operation would take a longer time and start of hydraulic excavator work would be delayed. According to this embodiment, start of hydraulic excavator work can be prevented from being delayed due to an erroneous determination.

As mentioned above, this embodiment is provided as vehicle state detection units (vehicle information detection units) with: the warm-up operation state determination unit 11A that determines a state of warm-up operation of the power storage apparatus 8 based on a temperature (minimum temperature in this embodiment) of the power storage apparatus 8 measured by a temperature sensor (upper temperature sensor 33 in this embodiment); the operation lever state detection unit 19 that detects a state of each operation lever 17 for operating the hybrid construction machinery; the gate lock lever state detection unit 51 that detects a state of the gate lock lever for switching the operation of the hybrid construction machinery between enabled and disabled; the output setting detection unit (engine set speed detection unit) 16A that detects an operating output setting of the hybrid construction machinery; the hydraulic oil temperature detection unit 60 that detects a temperature of a hydraulic oil for driving the work equipment of the hybrid construction machinery; the outside air temperature detection unit 61 that detects an outside air temperature; the warming medium temperature detection unit 62 that detects a temperature of a warming medium; and the prime mover engine speed detection unit 1a that detects an engine speed of the prime mover.

The operation lever state detection unit 19, the gate lock lever state detection unit 51, the output setting detection unit 16A, the hydraulic oil temperature detection unit 60, and the prime mover engine speed detection unit 1a are vehicle state detection units (vehicle information detection units) that detect states of the vehicle (vehicle information) related to the magnitude of output requested for the power storage apparatus 8. The warm-up operation state determination unit 11A, the outside air temperature detection unit 61, and the warming medium temperature detection unit 62 are vehicle state detection units (vehicle information detection units) that detect states of the vehicle (vehicle information) related to the length of a time required for warming up the power storage apparatus.

In this embodiment, states of the vehicle refer to the states, operations, or setting of varied on-board equipment mounted on the hybrid construction machinery. In this case, the states of on-board equipment include the states of an environment, for example, ambient temperature (outside air temperature), in which the on-board equipment is placed. In this sense, the above-mentioned vehicle state detection units may be designated as on-board equipment state detection units (on-board equipment information detection units) of the hybrid construction machinery.

In this embodiment, the controller 11 determines whether to change a warm-up mode to a warm-up priority mode or the other warm-up mode based on the above-mentioned vehicle information (on-board equipment information) detected by the vehicle state detection units. That is, vehicle information detected by the vehicle state detection units is used to estimate an output request for the power storage apparatus 8 from the vehicle (on-board equipment) to determine a warm-up mode. For this reason, the controller 11 constitutes a vehicle output request estimation unit (on-board equipment output request estimation unit) that estimates an output request from the vehicle and, at the same time, constitutes a warm-up mode determination unit that determines a warm-up mode. In this embodiment, owing to the provision of the vehicle output request estimation unit and the warm-up mode determination unit, it is possible to set a target temperature of the power storage apparatus 8 to be warmed to a temperature corresponding to a vehicle output request and prevent the power storage apparatus 8 from being warmed more than necessary. The above-mentioned output request from the vehicle may be a specific numeric value of electric power or may be, for example, the presence/absence of a request for high output requiring a warm-up priority mode. The presence/absence of a request for high output is determined based on the above-mentioned states of the vehicle.

As vehicle information for the vehicle output request estimation unit and the warm-up mode determination unit making up the controller 11 to make estimation and determination, other vehicle information (on-board equipment information) than described above may be used. Any other vehicle state detection unit (on-board equipment state detection unit) than the above-mentioned vehicle state detection unit may be provided for acquiring vehicle information.

Figure 13:
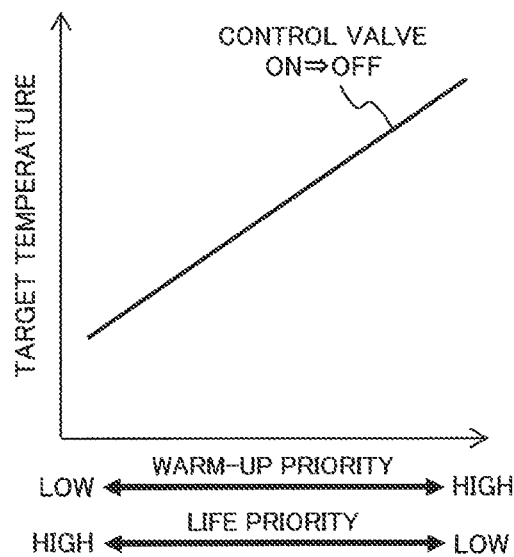
FIG. 13 is a drawing indicating a relation between cases of warm-up priority and life priority and warm-up target temperature in an embodiment of the present invention.
Figure 14:
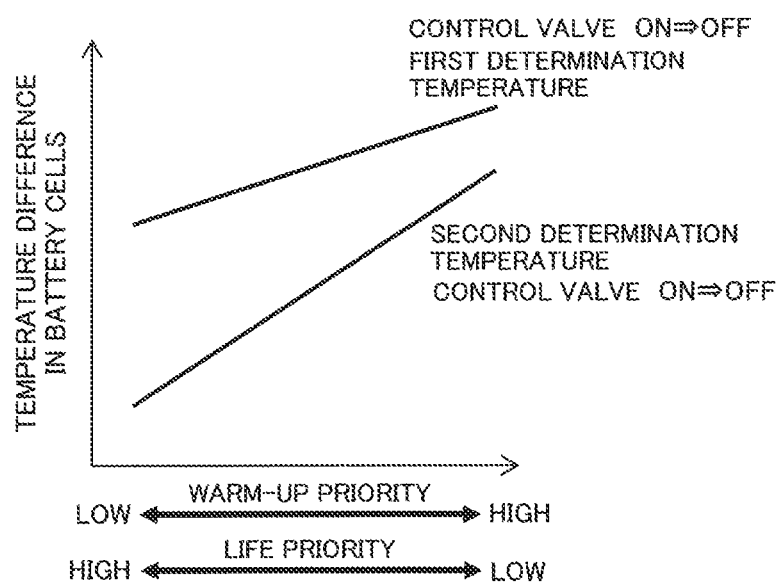
FIG. 14 is a drawing indicating a relation between cases of warm-up priority and life priority and a determination temperature for a temperature difference in a battery cell in an embodiment of the present invention.

Description will be given to a warm-up target temperature (T2) for the battery cells and determination temperatures (first determination temperature and second determination temperature) for temperature difference in battery cells in cases of warm-up priority and life priority. FIG. 13 indicates a relation between each case of warm-up priority and life priority and a warm-up target temperature in an embodiment of the present invention. FIG. 14 indicates a relation between each case of warm-up priority and life priority and determination temperatures for temperature difference in battery cells in an embodiment of the present invention.

In case of warm-up priority, as indicated in FIG. 13, a target temperature is raised so that the power storage apparatus 8 can produce high output. In case of life priority, meanwhile, a target temperature is lowered so as to reduce a number of times of operation of the control valve 35. The line in FIG. 13 indicates a temperature at which the control valve 35 is switched from ON to OFF. The warm-up target temperature need not be linearly varied as indicated in FIG. 13 and may be set curvedly or stepwise as long as the same effects can be obtained.

In case of warm-up priority, as indicated in FIG. 14, a first determination temperature for temperature difference in battery cells is raised to reduce a difference between the first determination temperature and a second determination temperature. As a result, the power storage apparatus 8 can be warmed up quickly so as to produce high output. In case of life priority, meanwhile, a first determination temperature for temperature difference in battery cells is lowered to increase a difference between the first determination temperature and a second determination temperature. As a result, a temperature difference in battery cells can be reduced to reduce a number of times of operation of the control valve 35. The determination temperatures for temperature difference in battery cells need not be linearly varied as indicated in FIG. 14 and may be set curvedly or stepwise as long as the same effects can be obtained.

When a determination of warm-up priority or life priority is made as mentioned above, both of a warm-up target temperature and determination temperatures for temperature difference in battery cells need not be varied and either of them may only be varied.

In this embodiment, as mentioned above, a battery temperature corresponding to a vehicle output request can be obtained.

In addition, a variation in the temperature of the power storage apparatus 8 can be suppressed. Further, a number of times of adjustment of a flow rate of a warming medium can be reduced as much as possible and thus the lives of such equipment as the power storage apparatus 8 and the control valve can be lengthened.

A description will be given to a case where a plurality of power storage apparatuses 8 are installed with reference to FIG. 15. FIG. 15 illustrates a method for connecting the cooling circuit and the warm-up circuit of a water jacket and a method for measuring a temperature difference in battery cells taken when a plurality of power storage apparatuses are installed.

As shown in FIG. 15, the water jackets 24 of the power storage apparatuses 8 are connected in parallel so as to prevent a difference in inlet temperature from being produced between the cooling medium and the warming medium. Only one control valve 35 is installed and the control valve 35 is controlled as shown in the flowchart in FIG. 8. A more specific description will be given. A pipe going from the engine side toward each water jacket 24 is bifurcated and the control valve 35 is placed on the upstream side of these points of bifurcation. Pipes returning from each water jacket 24 toward the engine side are gathered on the downstream side of the respective water jackets 24 and configured to return to the engine side. The reason why a control valve 35 is not provided in each power storage apparatus 8 is that a difference in temperature between power storage apparatuses 8 is suppressed without independently performing respective warm-up/warm-up maintenance operation. It is desirable that as the battery cell 30 for measuring a temperature difference in battery cells, the battery cell positioned most upstream of each water jacket 24 is used.

A temperature difference in battery cells may be measured in each power storage apparatus 8 or may be obtained by measuring a temperature difference in battery cells of one power storage apparatus 8. When a temperature difference in battery cells is measured in each power storage apparatus 8, the control valve 35 is ON/OFF-controlled based on the maximum value of temperature difference in battery cells.

When a plurality of power storage apparatuses 8 are installed, a temperature variation among the power storage apparatuses 8 can be suppressed by taking the above-mentioned measure.

The present invention is not limited to the above-mentioned embodiment and includes various modifications. For example, the above embodiment has been described in details for making the present invention easily understandable and all the above-mentioned configuration elements need not be provided. With respect to some configuration element of the above embodiment, any other configuration element may be added, the configuration element may be deleted or may be replaced with any other configuration element.

In the above description, a case where the hybrid construction machinery in this embodiment is configured of a hybrid hydraulic excavator has been taken as an example. However, the present invention is not limited to this case and is also applicable to any other construction machinery such as a hybrid wheel loader.

REFERENCE SINGS LIST

1 - - - Engine (prime mover),
2 - - - Assist power generation motor (electric motor),
4 - - - Operating device,
8 - - - Power storage apparatus,
11 - - - Controller,
11A - - - Warm-up operation state determination unit,
16 - - - Output setting unit,
16a - - - Engine speed adjust dial (output setting unit),
16b - - - Output mode set switch,
17 - - - Operation levers,
19 - - - Operation lever state detection unit,
20 - - - Temperature control device,
25 - - - Warm-up circuit,
30 - - - Battery cell,
33 - - - Upper temperature sensor,
34 - - - Lower temperature sensor,
35 - - - Control valve,
50 - - - Gate lock lever,
51 - - - Gate lock lever state detection unit,
60 - - - Hydraulic oil temperature detection unit,
61 - - - Outside air temperature detection unit,
62 - - - Engine coolant temperature detection unit.

The invention claimed is:

1. A hybrid construction machinery including a prime mover, an electric motor assisting the prime mover in power and generating electric power, a power storage apparatus transferring electric power to and from the electric motor, a warm-up circuit circulating a warming medium in the vicinity of the power storage apparatus, and a control device controlling circulation of the warming medium in the warm-up circuit, comprising:
   an on-board equipment state detection unit detecting a state of on-board equipment and enabling the control device to estimate an output request for the power storage apparatus from the on-board equipment,
   wherein the control device controls circulation of the warming medium based on a temperature of the power storage apparatus and a determination temperature for determining whether to circulate the warming medium in the warm-up circuit,
   wherein the control device varies the determination temperature based on a result of detection by the on-board equipment state detection unit,
   wherein the power storage apparatus includes a plurality of power storage cells,
   wherein the control device uses at least either of a target temperature for warming up the power storage apparatus and a temperature difference in the power storage cells provided in the power storage apparatus as the determination temperature,
   wherein the control device uses at least a temperature for determining a temperature difference in the power storage cells as the determination temperature,
   wherein as a temperature for determining a temperature difference in the power storage cells, there are provided a first determination temperature and a second determination temperature lower than the first determination temperature, and
   wherein the control device executes control such that circulation of the warming medium is stopped when a temperature difference in the power storage cells reaches the first determination temperature and the warming medium is circulated when a temperature difference in the power storage cells reaches the second determination temperature.

2. The hybrid construction machinery according to claim 1,
   wherein the on-board equipment state detection unit includes at least one of an operation lever state detection unit detecting a state of an operation lever for operating the hybrid construction machinery, a gate lock lever state detection unit detecting a state of a gate lock lever for switching the operation of the hybrid construction machinery between enabled and disabled, a prime mover set speed detection unit detecting a set engine speed of the prime mover, a hydraulic oil temperature detection unit detecting a temperature of a hydraulic oil for driving work equipment mounted on the hybrid construction machinery, a prime mover engine speed detection unit detecting an engine speed of the prime mover, a warm-up operation state determination unit determining a state of warm-up operation on the power storage apparatus, an outside air temperature detection unit detecting an outside air temperature, and a prime mover cooling water temperature detection unit detecting a temperature of cooling water of the prime mover.

3. The hybrid construction machinery according to claim 1,
   wherein the control device uses at least a temperature for determining a temperature difference in the power storage cells as the determination temperature, and
   wherein a temperature measuring unit detecting a temperature difference in the power storage cells measures a temperature difference in a power storage cell positioned on a most upstream side in a direction in which the warming medium flows.

* * * * *